B. KOLLMAN.
DRIVING MECHANISM.
APPLICATION FILED MAR. 17, 1921.
1,438,313.
Patented Dec. 12, 1922.
2 SHEETS—SHEET 2.
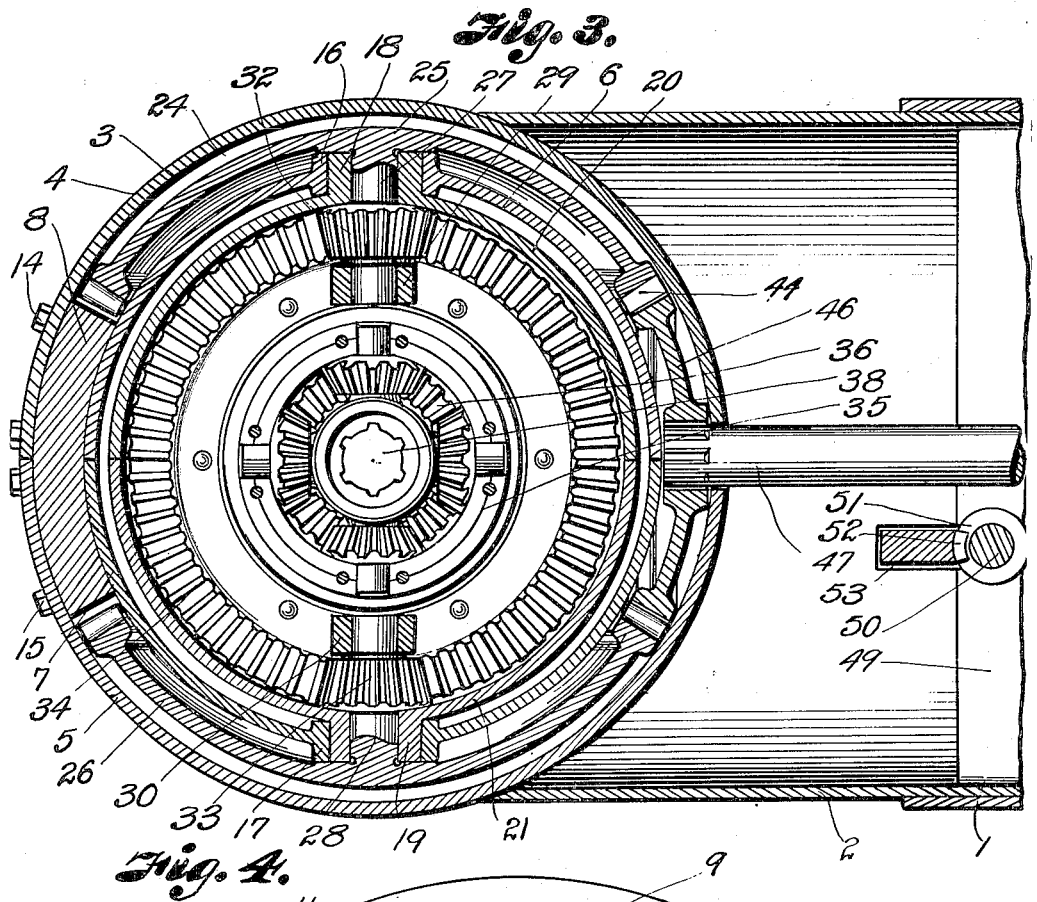
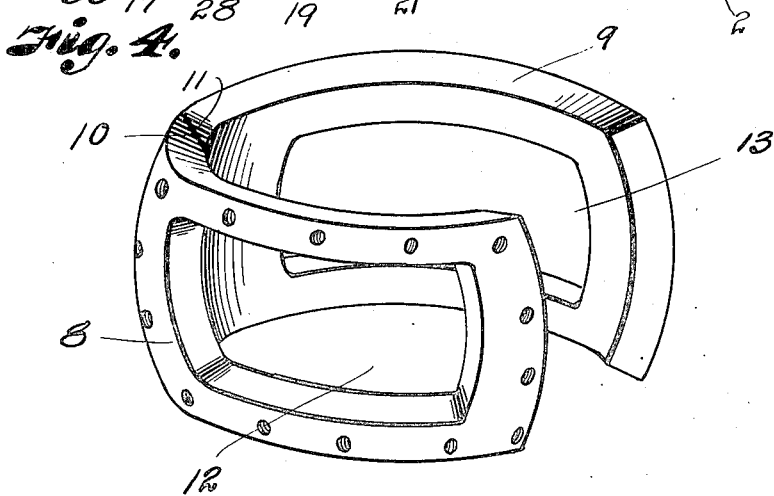
INVENTOR
Bartholomew Kollman
BY
ATTORNEY Patented Dec. 12, 1922.

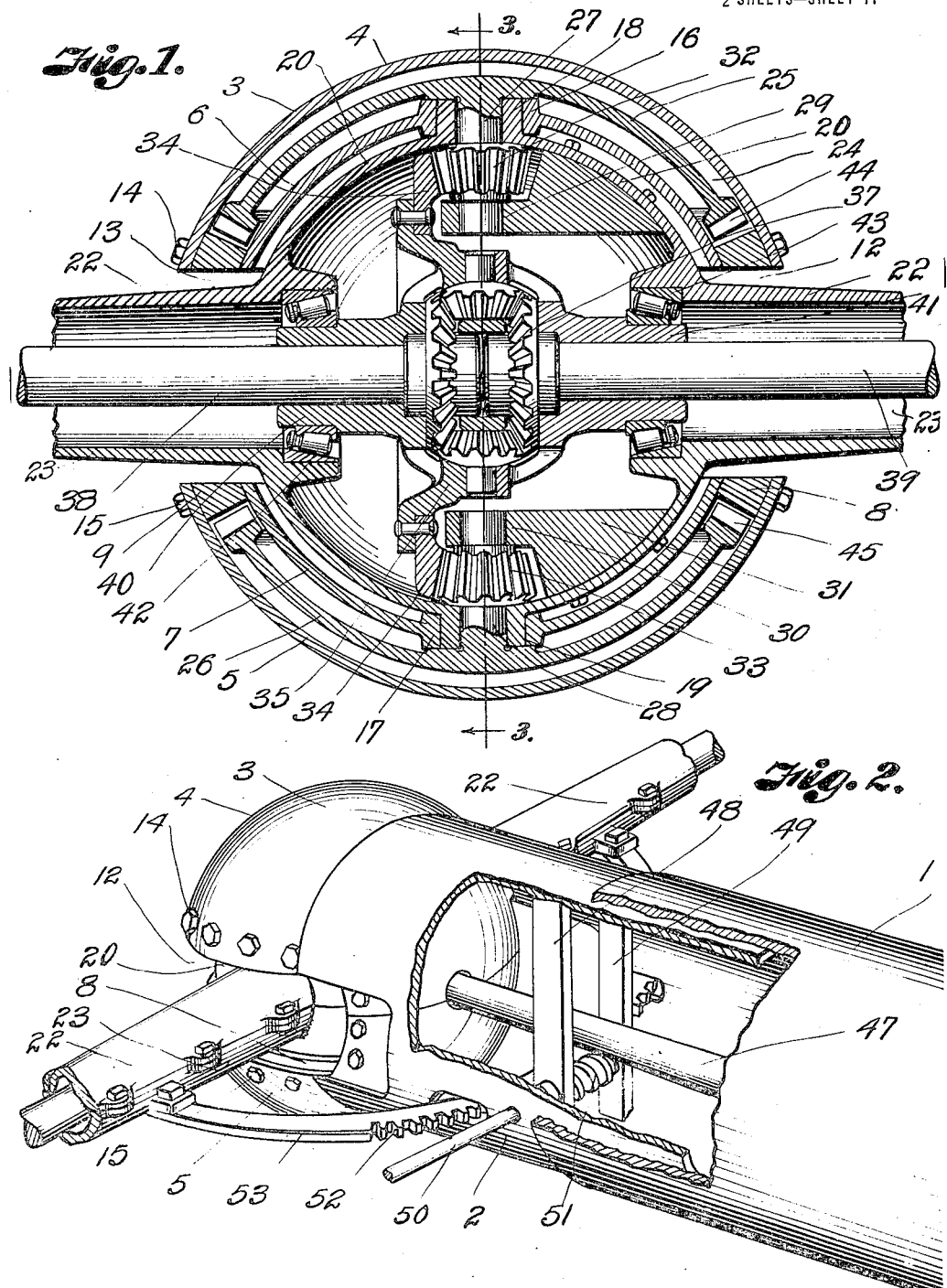

1,438,313

UNITED STATES PATENT OFFICE.

BARTHOLOMEW KOLLMAN, OF BEAVER, OKLAHOMA.

DRIVING MECHANISM.

Application filed March 17, 1921. Serial No. 452,992.

*To all whom it may concern:*

Be it known that I, BARTHOLOMEW KOLLMAN, a citizen of the United States, residing in the county of Beaver and State of Oklahoma, have invented certain new and useful Improvements in Driving Mechanism; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to driving mechanism for vehicles and the primary object thereof is to provide a novel form of driving mechanism whereby the power from the engine may be transmitted to the wheels of the vehicle, the invention being so constructed that it is adapted to drive the back wheels, the front wheels, or all four wheels may be driven, and it is an important feature of my invention that the driving mechanism be so constructed that the vehicle may be steered as well as propelled by the same mechanism. Therefore, the invention is particularly capable of application to a four-wheel drive organization, although, obviously, it may be utilized as a two-wheel drive.

It is also an important feature of my invention that the mechanism is confined within a relatively small space whereby a compact gearing is provided, yet there is sufficient flexibility in the gearing to provide for the shifting of the axles for steering as well as to permit the wheels to maintain traction with the ground when the road is uneven.

With the above objects in view, the invention consists in certain novel parts and combinations of parts, all of which will be specifically referred to hereinafter, reference being had to the accompanying drawings, in which Fig. 1 is a vertical, cross sectional view through a driving mechanism constructed in accordance with my invention.

Fig. 2 is a perspective view of the driving mechanism with the parts assembled and drawn on a slightly reduced scale.

Fig. 3 is a vertical, longitudinal, sectional view on the line 3—3 of Fig. 1, looking in the direction of the arrow, and Fig. 4 is a detail perspective view of a spacing and connecting ring for connecting the two halves of the substantially spherical housing.

Hereinafter I shall refer to the invention generically as a driving mechanism, it being understood, however, that it contemplates a steering mechanism as well.

Referring now to the drawings by numerals of reference:

1 designates the drive shaft housing, which is shown as tubular. The housing 1 may be fastened to the vehicle in any appropriate manner, and received within the same is a telescopic complementary tubular member 2 which constitutes a bracket or support for the gear case 3. The tubular member 2 may be fastened to the gear case 3 in any appropriate manner so that it will be rigid therewith, and the member 2 may have axial movement within the housing 1 to accommodate for the movement of the wheels over the uneven roadbed, it being understood, of course, that the tubular member 2 extends a sufficient distance within the tubular member 1 to afford ample support therefor.

The case 3 consists of two semi-spherical outer members 4 and 5 and two similar semi-spherical inner members or walls 6 and 7, the members 6 and 7 being spaced from the members 4 and 5 by the spacing ring, shown in Fig. 4; the spacing ring also serving as means for connecting the outer case with its double walls 4, 5, 6 and 7.

By reference to Fig. 4 it will be observed that the spacing ring is an open ring consisting of two members 8 and 9, the meeting edges of which have inclined faces 10 and 11, which abut one against the other to make a convenient joint. The outer ends of the members 8 and 9, however, are spaced apart so that an open or split ring is provided, the purpose of which will be apparent as the nature of the invention is better understood.

The two members 8 and 9 are provided with slots 12 and 13 to permit the axle members to swing in a horizontal arc during guiding and the housing members 4, 5, 6 and 7 are cut away to provide elongated slots similar to those designated 12 and 13 because the axle members project through the rigid housing 3, which is fastened to the member 2. At diametrically opposite points, however, the members 4, 5, 6 and 7 have meeting edges which are secured by bolts 14 and 15 which pass through the ring and through the members 4, 5, 6 and 7 to provide a rigid unitary structure, within which the gears for the driving mechanism are confined.

By reference to Figs. 1 and 2 it will be observed that the members 6 and 7 are provided with bearings 16 and 17, in which are mounted the hollow trunnions 18 and 19 of the spherical inner gear case consisting of the two semi-spherical members 20 and 21 on the half round axle housing members 22 and 23. Each member 20 and 21 has a tubular trunnion, the two trunnions being loosely mounted in the bearings 16 and 17 so that the inner housing members 20 and 21 and their axle housings 22 and 23 may turn about the axes of the trunnions 18 and 19, the axle members 22 extending through slots in the outer housing consisting of the members 4, 5, 6 and 7 and in the slots in the spacing and connecting ring consisting of the members 8 and 9.

The inner and outer walls of the outer case or housing enclose a space 24, in which are two concavo-convex gears 25 and 26, located diametrically opposite one to the other and having teeth on their perimeters, the gears conforming in shape to the general spherical shape of the housing. The gears are provided with inwardly projecting stub shafts 27 and 28, which extend through the trunnions 18 and 19 and into the bearing brackets 29 and 30 on the bearing block 31, carried by the semi-spherical members 20 and 21. Therefore, the stub shafts 27 and 28 have two bearings consisting of the trunnions 16 and 17 and brackets 29 and 30 on the block 31.

The stub shafts 27 and 28 carry pinions 32 and 33 which mesh with the master or ring gear 34 connected to the housing 35 of a conventional differential gearing, the driven gears 36 and 37 of which are keyed to the axle members 38 and 39 of a split axle in the usual way, the axle members 38 and 39 projecting in opposite directions through the oppositely disposed tubular portions 40 and 41 on the housing 35 and said tubular members 40 and 41 are mounted in bearings 42 and 43 in the axle housing members 22 and 23, as clearly seen in Fig. 1.

Therefore the axle members 38 and 39 to which the wheels are connected, may rotate relatively to the tubular members 40 and 41 as well as relatively to one another. The differential gearing per se will not be described in this application as it is of a conventional type well understood.

The teeth 44 and 45 of the gears 25 and 26 are at all times engaged by the teeth of a concavo-convex pinion 46, to which the transmission shaft 47 is keyed, as seen in Fig. 3. The transmission shaft 47 receives its power from the power generating mechanism of the vehicle, generally the engine and transmission gears, as is well understood. Therefore, when the transmission shaft 47 rotates, the pinion 46 will rotate the gears 25 and 26 and since the pinions 32 and 33 are keyed thereon, said pinions will be rotated in opposite directions, imparting motion to the ring or master gear 34 in one direction by applying power at diametrically opposite points. Therefore, the differential gearing may be driven in either direction, according to the direction of rotation of the shaft 47 and attention is called to the fact that by the method of transmitting the power from the shaft 47 to the differential gearing, a double reduction is provided within a relatively small compact space, a material advantage in driving mechanism designed for trucks, tractors and the like where power is more important than speed.

The means for steering the wheels through the axle members is comparatively simple. By reference to Fig. 2 it will be observed that the tubular member 2 carries two vertical posts 48 and 49, in which is mounted a worm shaft 50, carrying a worm 51, which meshes with teeth 52 on a segmental rack 53, the ends of which are fastened to the axle housing members 22 and 23. Remembering that the outer casing 3 is fastened to the tubular member 2, it will be apparent that when the worm 51 is turned, its engagement with the teeth 52 will result in causing a swinging movement to be imparted to the rack 53 and since the ends of the rack 53 are fastened to the ends of the axle housing members 22 and 23, it is obvious that the semi-spherical members 20 and 21 integral with the members 22 and 23 will turn about the axes of the trunnions in the bearings 16 and 17 and since the stub shafts 27 and 28 are in axial alignment, it will be apparent that the shifting or turning of the axle to steer the vehicle can be accomplished in a most convenient manner since all the parts will rotate about the axial center.

From the foregoing it will be apparent that a device constructed in accordance with my invention will be simple in construction, compact, and readily installed in the vehicle to which it is to be attached, that it is equally adaptable for use for a two or four wheel drive, and that the wheels may be conveniently steered by a simple form of steering mechanism and while I have specifically referred to the various parts in detail, I do not wish to be limited to the exact details of construction shown but reserve the right to make such changes in form, proportion and minor details of construction as come within the scope of the appended claims without departing from the spirit of my invention.

What I claim and desire to secure by Letters Patent is:

1. A driving mechanism comprising a casing, oppositely located gears within the casing, a pinion between them for driving them in opposite directions, pinion gears driven by the first named gears, and a differential gearing within the casing including a ring gear in mesh with the pinion gears whereby power will be communicated from the first named gears to the ring gear of the differential gearing.

2. A driving mechanism comprising a spherical housing, concavo-convex gears within the housing, stub shafts for supporting the gears, a pinion between the gears for rotating them in opposite directions, pinions on the stub shafts, and a differential gearing having a ring gear in mesh with the pinions on the stub shafts.

3. A driving mechanism comprising a spherical housing having oppositely located slots, axle members projecting through the slots and having hollow trunnions, said trunnions being mounted in the housing so that the axle members may swing about the axes of the trunnions, gears within the housing having stub shafts projecting through the trunnions at the ends of the axle members, pinion gears carried by the stub shafts, a differential gearing within the housing having a ring gear in mesh with the pinions on the stub shafts, axle sections within the housing members and driven by the differential gearing, and means for communicating motion to the first named gears in opposite directions.

4. A driving mechanism comprising a spherical housing having oppositely located slots, axle members projecting through the slots and having hollow trunnions, said trunnions being mounted in the housing so that the axle members may swing about the axes of the trunnions, gears within the housing having stub shafts projecting through the trunnions at the ends of the axle members, pinion gears carried by the stub shafts, a differential gearing within the housing having a ring gear in mesh with the pinions on the stub shafts, axle sections within the housing members and driven by the differential gearing, and a pinion between the first named gears and meshing with the teeth thereof to rotate them in opposite directions.

5. A driving mechanism comprising a spherical housing having diametrically oppositely located elongated slots, concavo-convex gears mounted diametrically opposite one to the other and having stub shafts mounted in the housing, a concavo-convex pinion located between and meshing with said gears, pinions mounted on the stub shafts, and a differential gearing having a master gear meshing with the pinions.

6. A driving mechanism comprising a spherical housing consisting of two double walled, semi-spherical members, means for fastening the double walled members together to provide a housing having oppositely located, elongated slots, a stub shaft projecting through the inner wall of each housing member, a concavo-convex gear on the outer end of each stub shaft, a pinion on the inner end of each stub shaft, means for rotating the concavo-convex gears, and a gear within the housing meshing with the pinions, and a shaft driven by said gear.

7. A driving mechanism comprising a housing consisting of two semi-spherical members having parts cut away so that when they are brought together they form substantially a sphere with oppositely located slots, an axle housing projecting through the slots and having trunnions engaging the spherical members of the housing so that the axle housing members may swing in an arc with respect to the housing, axle members within the axle housing members, a differential gearing for gearing them together, concavo-convex gears within the housing having stub shafts concentric therewith, pinions mounted on the stub shafts, brackets within the housing for supporting the stub shafts, the pinions on the stub shafts meshing with the master gear of the differential gearing.

8. A driving mechanism comprising a spherical housing consisting of two semi-spherical members having parts of their spherical members spaced apart to provide oppositely located, elongated slots, axle housing members having semi-spherical hollow portions with projections which provide trunnions, the trunnions being mounted in the spherical housing at right angles to the slots, bracket members carried by the axle housing members, stub shafts supported thereby, pinions on the stub shafts, gears on the stub shafts, a pinion for meshing with the last named gears on the stub shafts whereby power can be communicated to the stub shafts, and a differential gearing within the semi-spherical portions of the axle housing members and receiving power from the pinions on the stub shafts.

9. A driving gearing comprising a drive shaft housing consisting of a tubular member, a second tubular member sleeved therein and mounted for independent movement with respect thereto, a spherical housing rigid with the second member, a drive shaft extending longitudinally of the first and second members and entering the housing, a pinion thereon, concavo-convex gears meshing with the pinion, stub shafts concentric to said gears and rigid therewith, pinions on the inner ends of the stub shafts, and a differential gearing having a ring gear meshing with the pinions.

In testimony whereof I affix my signature in presence of two witnesses.

BARTHOLOMEW KOLLMAN.

Witnesses:
I. N. EDWARDS,
FRANK FLECK.